US009915339B2

(12) United States Patent
Takagi et al.

(10) Patent No.: US 9,915,339 B2
(45) Date of Patent: Mar. 13, 2018

(54) DRIVE FORCE TRANSMISSION DEVICE

(71) Applicant: Nissan Motor Co., Ltd., Yokohama, Kanagawa (JP)

(72) Inventors: Yasuo Takagi, Komae (JP); Kazuhiro Miyachi, Yamato (JP)

(73) Assignee: Nissan Motor Co., Ltd., Yokohama (JP)

( * ) Notice: Subject to any disclaimer, the term of this patent is extended or adjusted under 35 U.S.C. 154(b) by 988 days.

(21) Appl. No.: 14/351,227

(22) PCT Filed: Oct. 31, 2012

(86) PCT No.: PCT/JP2012/078127
§ 371 (c)(1),
(2) Date: Apr. 11, 2014

(87) PCT Pub. No.: WO2013/077160
PCT Pub. Date: May 30, 2013

(65) Prior Publication Data
US 2014/0230593 A1   Aug. 21, 2014

(30) Foreign Application Priority Data

Nov. 22, 2011   (JP) .................................. 2011-255272

(51) Int. Cl.
*F16H 57/04*     (2010.01)
*F16H 57/021*    (2012.01)
(Continued)

(52) U.S. Cl.
CPC ............. *F16H 57/021* (2013.01); *B60K 6/26* (2013.01); *B60K 6/405* (2013.01); *B60L 3/0061* (2013.01);
(Continued)

(58) Field of Classification Search
CPC ..... F16H 57/0441; F16H 57/021; B60K 6/26; B60K 6/405; B60L 3/0061; B60L 11/14; B60L 15/20; B60L 15/2054; H02K 24/00
See application file for complete search history.

(56) References Cited

U.S. PATENT DOCUMENTS

| 9,080,612 | B2 * | 7/2015 | Fujii ........................ F16D 13/72 |
| 2010/0261575 | A1 * | 10/2010 | Schoenek .............. B60K 6/405 477/5 |

(Continued)

FOREIGN PATENT DOCUMENTS

| JP | 8-68456 A | 3/1996 |
| JP | 2004-68865 A | 3/2004 |

(Continued)

*Primary Examiner* — Zakaria Elahmadi
(74) *Attorney, Agent, or Firm* — Global IP Counselors, LLP

(57) ABSTRACT

A drive force transmission device is provided with a motor shaft, a transmission input shaft, a drive side sprocket, a resolver rotor and a cylindrical resolver retainer. The motor shaft is configured to be connected to a motor rotor of a motor. The driving force transmission shaft is coaxially connected to the motor shaft. The oil pump sprocket is provided on the driving force transmission shaft for rotating an oil pump. The resolver rotor is disposed on the motor shaft adjacent the oil pump sprocket for detecting a rotational position of the motor. The cylindrical resolver retainer is coaxially disposed on the motor shaft to fix the resolver rotor to the motor shaft. The resolver retainer includes a stopper that forms an axial positioning surface for the resolver rotor by contacting an end portion of the motor shaft, and an axial position limiting surface of the oil pump sprocket.

4 Claims, 4 Drawing Sheets

(51) Int. Cl.
*B60K 6/26* (2007.10)
*H02K 24/00* (2006.01)
*B60K 6/405* (2007.10)
*B60L 3/00* (2006.01)
*B60L 11/14* (2006.01)
*B60L 15/20* (2006.01)
*B60K 6/543* (2007.10)
*F16H 57/02* (2012.01)

(52) U.S. Cl.
CPC ............... *B60L 11/14* (2013.01); *B60L 15/20* (2013.01); *B60L 15/2054* (2013.01); *F16H 57/0441* (2013.01); *H02K 24/00* (2013.01); *B60K 6/543* (2013.01); *B60L 2210/40* (2013.01); *B60L 2220/14* (2013.01); *B60L 2240/36* (2013.01); *B60L 2240/423* (2013.01); *B60L 2240/443* (2013.01); *B60L 2240/486* (2013.01); *B60L 2240/507* (2013.01); *F16H 2057/02095* (2013.01); *Y02T 10/641* (2013.01); *Y02T 10/645* (2013.01); *Y02T 10/70* (2013.01); *Y02T 10/7077* (2013.01); *Y02T 10/7241* (2013.01); *Y02T 10/7275* (2013.01); *Y10T 74/19995* (2015.01)

(56) References Cited

U.S. PATENT DOCUMENTS

| | | | |
|---|---|---|---|
| 2011/0132141 A1* | 6/2011 | Mizuno | F16H 41/30 74/730.1 |
| 2012/0104904 A1* | 5/2012 | Abiko | H02K 7/006 310/68 B |
| 2016/0169374 A1* | 6/2016 | Kanada | B60K 6/365 475/5 |

FOREIGN PATENT DOCUMENTS

| | | |
|---|---|---|
| JP | 2008-291866 A | 12/2008 |
| JP | 2009-36314 A | 2/2009 |
| WO | 2010125640 A1 | 11/2010 |
| WO | 2012029441 A1 | 3/2012 |

* cited by examiner

DRIVE FORCE TRANSMISSION DEVICE

CROSS-REFERENCE TO RELATED APPLICATIONS

This application is a U.S. National stage application of International Application No. PCT/JP2012/078127, filed Nov. 16, 2012, which claims priority to Japanese Patent Application No. 2011-255272 filed in Japan on Nov. 22, 2011, the contents of which are hereby incorporated herein by reference.

BACKGROUND

Field of the Invention

The present invention relates to a driving force transmission device, in which an oil pump sprocket for driving an oil pump and a resolver rotor for detecting a rotational position of a motor are disposed adjacent to each other.

Background Information

Conventionally, a driving force transmission device for an engine equipped vehicle is known in which a drive side sprocket of a chain-drive mechanism is rotatably supported on an input shaft of a transmission when an oil pump is driven by the input shaft of the transmission in a drive system through a chain-drive mechanism (for example, see Japanese Laid-Open Patent Application No. 2009-36314A).

SUMMARY

However, in the conventional driving force transmission device, a drive side sprocket is formed with a wall at a position close to a torque converter housing and a part or component such as a shim (a thin plate-shaped spacer) or the like is used in order to maintain an axial clearance of the drive side sprocket constant. Therefore, it is necessary to provide several parts such as the shim, a snap ring and so on to have an axial position-limiting function so that the axial clearance of the drive side sprocket is adequately maintained. Consequently, the number of parts of the conventional driving force transmission device is increased. In addition, the drive side sprocket is disposed in a narrow space. Thus, there is a problem of poor assembly workability due to difficulties in assembly.

In view of the aforementioned problems, the present invention has been made and has an object to provide a driving force transmission device with a reduced number of parts and good assembly workability.

To accomplish the object described above, a driving force transmission device according to an embodiment of the present invention includes a motor shaft, a driving force transmission shaft, an oil pump sprocket, a resolver rotor and a cylindrical resolver retainer. The motor shaft is connected to the motor rotor of a motor. The driving force transmission shaft is connected concentrically to the motor shaft. The oil pump sprocket is provided on the driving force transmission shaft and is configured to drive the oil pump. The resolver rotor is disposed on the motor shaft at a position adjacent to the oil pump sprocket and is configured to detect a rotational position of the motor. The cylindrical resolver retainer is disposed concentrically on the motor shaft and configured to support fixedly the resolver rotor on the motor shaft. The resolver retainer includes a stopper having an inner contacting surface forming an axial positioning surface provided on an inner surface of the stopper to be in contact with an end portion of the motor shaft and configured to position an axial position of the resolver rotor, and an outer limiting surface forming an axial position-limiting surface provided on an outer side end surface of the stopper opposite to the axial positioning surface and configured to limit an axial position of the oil pump sprocket.

In the driving force transmission device according to the present invention, the axial position of the resolver rotor is positioned by contacting the inner contacting surface of the stopper of the resolver retainer as axial positioning surface with the end portion of the motor shaft. On the other hand, the axial position of the oil pump sprocket is limited by the outer limiting surface of the stopper as axial positioning surface. In other words, after the resolver rotor has been assembled using the resolver retainer, only by coupling the motor shaft and the driving force transmission shaft concentrically, the outer side end surface of the resolver retainer performs an axial position limiting function of the oil pump sprocket. Consequently, it is not necessary to provide parts such as a shim, a snap ring, etc., which are used to maintain an adequate clearance with the oil pump sprocket. In addition, it is not necessary to assemble the oil pump sprocket in the narrow space using the shim, snap ring, etc. In this way, by using the resolver retainer for limiting the axial position of the oil pump sprocket, it is possible to achieve reduction in numbers of parts to improve assembly workability when assembling the oil pump sprocket and the resolver rotor.

BRIEF DESCRIPTION OF THE DRAWINGS

Referring now to the attached drawings which form a part of this original disclosure.

DETAILED DESCRIPTION OF THE EMBODIMENTS

A best mode for implementing a driving force transmission device according to the present invention will now be described based on a first embodiment shown in FIG. 1.

Embodiment 1

A configuration of the driving force transmission device applied to a hybrid electric vehicle is first described. Specifically, the configuration of the driving force transmission device (one example of the driving force transmission device for an electrically driven vehicle) in the first embodiment is described separately in an "overall configuration", "essential configuration".

Overall Configuration

Figure 1:
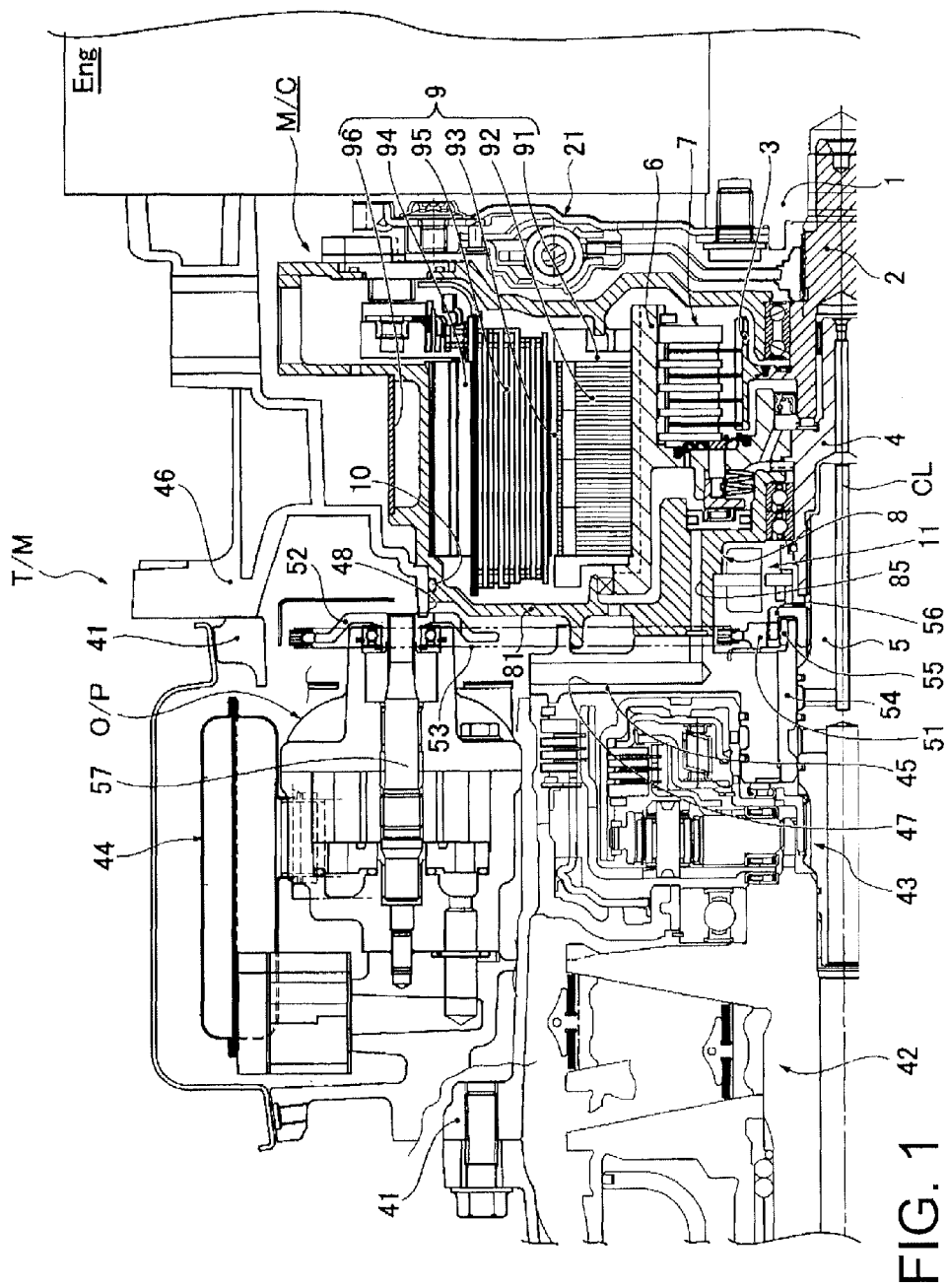
FIG. 1 is an overall schematic view showing an entire driving force transmission device (one example of a driving force transmission device for an electric vehicle) for a hybrid electric vehicle according to a first embodiment of the present invention.

FIG. 1 is an overall schematic view showing a configuration of the driving force transmission device (one example of a drive force transmission device) for a hybrid electric vehicle in the first embodiment. The overall configuration of the driving force transmission device for a hybrid electric vehicle is described below with reference to FIG. 1.

As shown in FIG. 1, the driving force transmission device for a hybrid vehicle includes an engine Eng, a motor & clutch unit M/C, a transmission unit T/M. Further, an engine output shaft 1, a clutch hub shaft 2, a clutch hub 3, a motor shaft 4, a transmission input shaft 5 (a driving force transmission shaft), a clutch cover 6, a dry-type multi-plate clutch 7, a slave cylinder 8, and a motor/generator (motor) 9.

The driving force transmission device is configured to connect the motor/generator 9 and the transmission input shaft 5 through the clutch cover 6 and the motor shaft 4 when the normally-open, dry-type multi-plate clutch 7 is caused to be disengaged. Thus, an "Electric Vehicle Running Mode" is achieved in which only the motor/generator provides a driving power source. Further, the engine Eng and the motor/generator 9 are connected through the dry-type, multi-plate clutch 7, and the motor/generator 9 and the transmission input shaft 5 are connected through the clutch drum 6 and the motor shaft 4 so that the engine Eng and the motor/generator 9 are used as a driving power source, when the dry-type, multi-plate clutch 7 is hydraulically engaged by the slave cylinder 8. Note that a dumper 21 is disposed between the engine output shaft 1 and the clutch hub shaft 2.

The motor and clutch unit M/C (a hatched sectional area in FIG. 1) includes the dry-type multi-plate clutch 7, the slave cylinder 8, and the motor/generator 9, as shown in FIG. 1. A cylinder housing 81 including a first clutch pressure oil passage 85 that communicates with the slave cylinder 8 is provided in the motor and clutch unit M/C hermetically by an O-ring 10.

The dry-type multi-plate clutch 7 is disposed between the engine Eng and the motor/generator 9 and is configured to selectively connect and disconnect transmission of driving force between the engine Eng and the motor/generator 9.

The slave cylinder 8 engages or fastens the dry-type, multi-plate clutch 7 by guiding a clutch pressure produced by the transmission unit T/M through the first clutch pressure oil passage 85. The dry-type, multi-plate clutch 7 is disengaged or released by draining the clutch pressure in the first clutch pressure oil passage 85.

The motor/generator 9 is disposed at an outer circumferential position of the clutch cover 6 of the dry-type, multi-plate clutch 7 and is configured to perform the driving force transmission with the transmission input shaft 5. The motor/generator 9 is a synchronous-type, alternate-current electric motor using a three-phase alternating current and includes a rotor-supporting frame 91 formed integrally with the clutch cover 6, a motor rotor 92 which is fixedly supported by the rotor-supporting frame 91. Further, stator teeth 94 disposed on the motor rotor 92 with an air gap 93 and fixed on the cylinder housing 81, and a stator coil 95 wound around the stator teeth are provided, respectively. Note that a water jacket 96 to allow cooling water to communicate is provided in the cylinder housing 81. A resolver 11 for detecting a rotational position of the motor rotor 92 of the motor/generator 9 is also provided at an end position of the motor shaft 4.

The transmission unit T/M is connected to the motor and clutch unit M/C and includes a transmission housing 41, a V belt-type continuously variable mechanism 42, and an oil pump O/P, as shown in FIG. 1. The transmission unit T/M is further provided with a mechanism 43 for changing a forward and a backward running, an oil tank 44, an end plate 45, and a clutch unit case 46 including an opening portion 48. The clutch unit case 46 is fixed integrally to the transmission housing 41. The end plate 45 includes a second clutch oil pressure passage 47.

The V belt type-continuously variable mechanism 42 is housed in the transmission housing 41 and is configured to control two pulleys over which a V belt is bridged and wound to acquire a non-step speed change ratio by changing a belt contact diameter in response to a hydraulic driving force.

The oil pump O/P is an oil pressure source which supplies an oil pressure to a required part. It uses an oil pump pressure as a source pressure and guides the oil pressure from a control valve (not shown) which adjusts oil pressure to a pulley chamber, a clutch and braking oil pressure or the like, to a required part. The oil pump O/P is configured to perform a pump driving by transmitting a rotational driving torque of the transmission input shaft 5 through a chain-driving mechanism. The chain-driving mechanism includes a drive side sprocket or oil pump sprocket 51 rotatable along with the rotational driving of the transmission input shaft 5, a driven side sprocket 52 operative to rotatably drive a pump shaft 57, and a chain 53 wound on both sprockets 51, 52.

Essential Configuration

Figure 2:
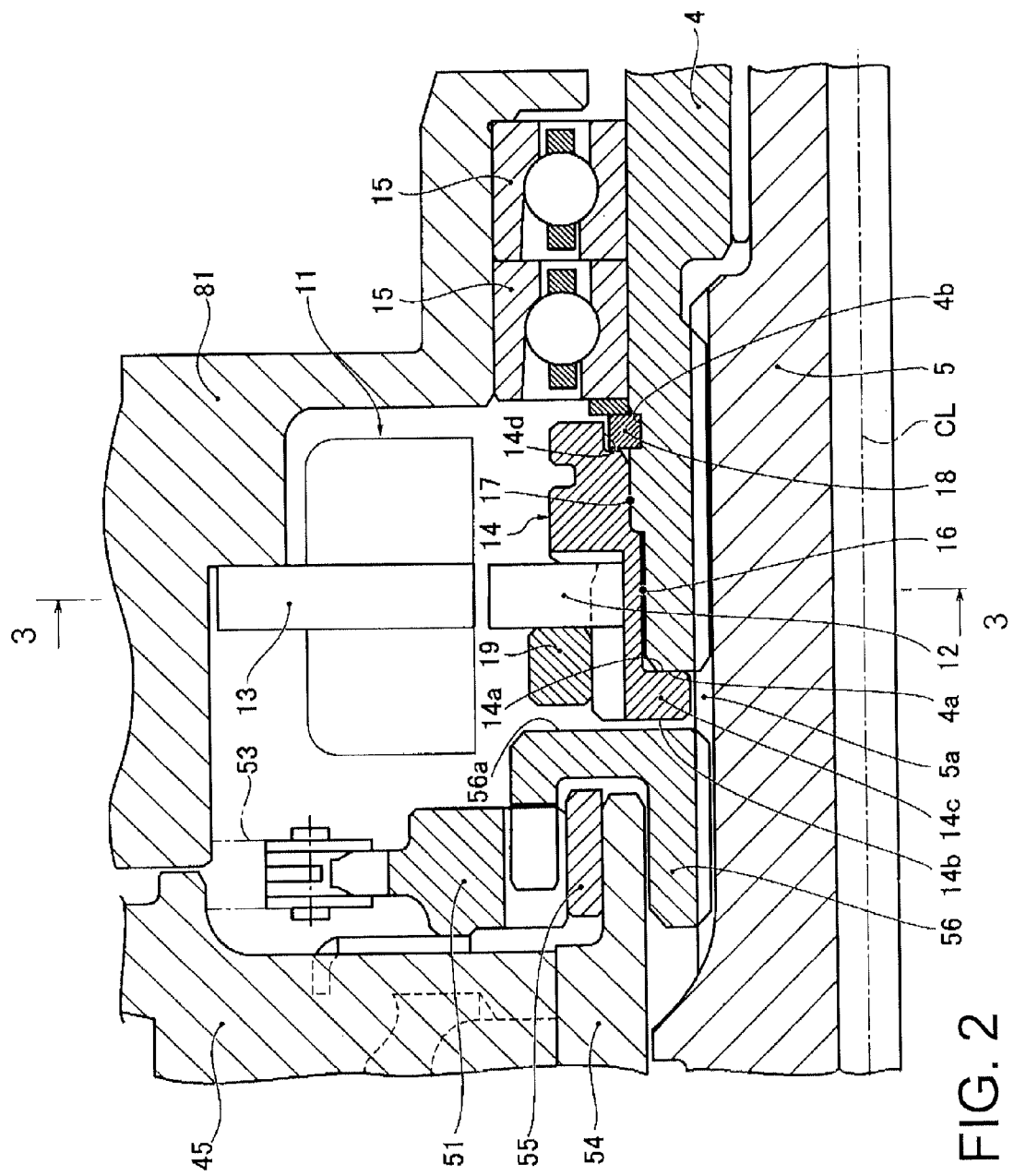
FIG. 2 is a sectional view showing a main part in which a resolver and a drive side sprocket of an oil pump are provided in the driving force transmission device for a hybrid electric vehicle according to the first embodiment.
Figure 3:
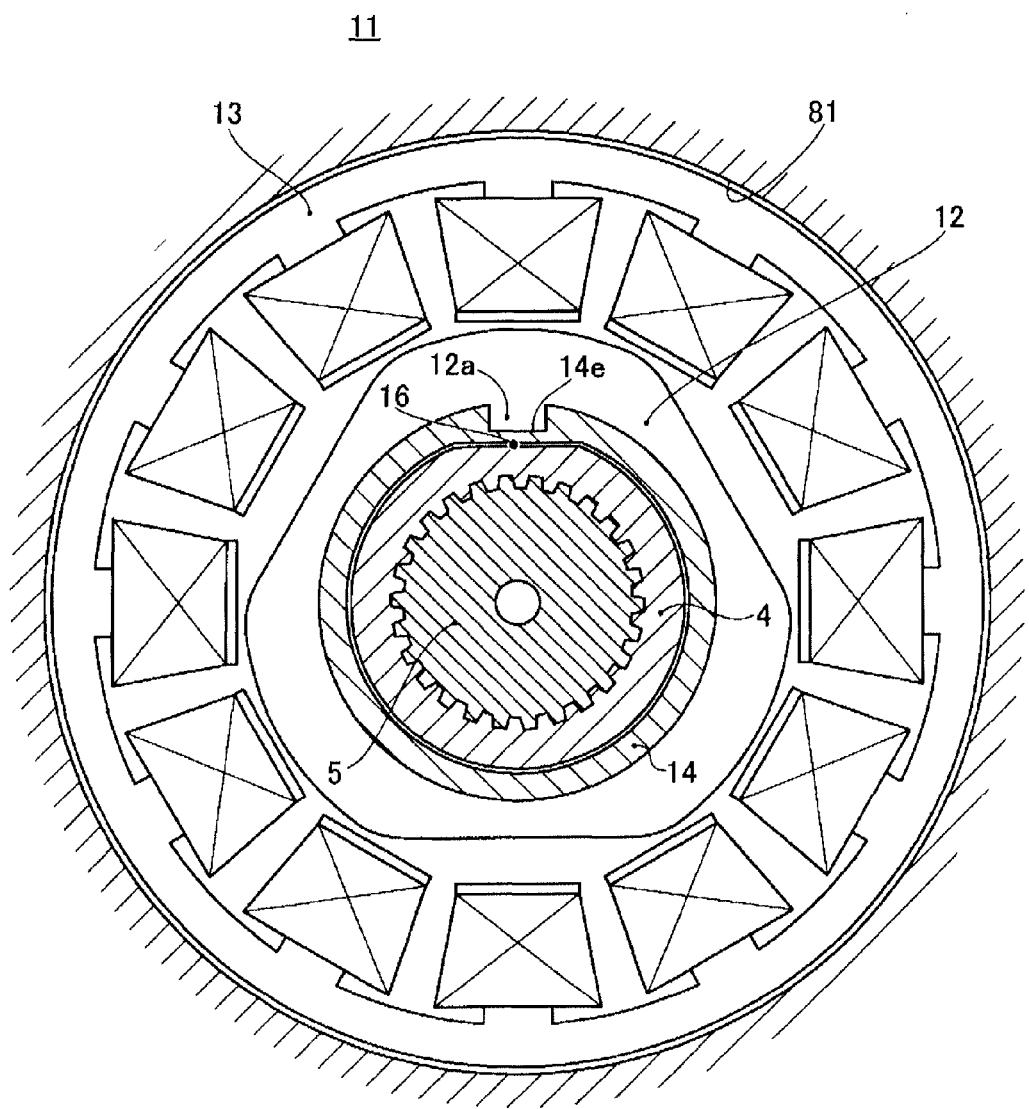
FIG. 3 is a sectional view taken along line 3-3 in FIG. 2 showing a fixing portion supporting a resolver rotor in the driving force transmission device for a hybrid electric vehicle according to the first embodiment.

FIG. 2 illustrates a main or essential part in which the resolver 11 and the drive side sprocket of the oil pump are provided, in the driving force transmission device for a hybrid vehicle according to the embodiment. FIG. 3 illustrates a stationary supporting portion of a resolver rotor. A connecting structure between the motor & clutch unit M/C and a transmission unit T/M, which represents the essential part of the present invention, is now described with reference to FIGS. 2 and 3.

The connection portion between the motor & clutch unit M/C and the transmission unit T/M includes, as shown in FIG. 2, the motor shaft 4, the transmission input shaft 5 (driving force transmission shaft), the drive side sprocket 51 (oil pump sprocket), a resolver rotor 12, a resolver retainer 14, a snap ring 18, and a fixing ring 19.

The motor shaft 4 is connected to the motor rotor 92 of the motor/generator 9 (motor) through the clutch cover 6. In other words, the motor shaft 4 is a shaft member rotatable integrally with the motor rotor 92. This motor shaft 4 is rotatably supported on the cylinder housing 81 (case member) via a pair of bearings 15, 15.

The transmission input shaft 5 is splined to the motor shaft 4 coaxially with the rotation axis CL of the motor shaft 4. The drive side sprocket 51 is also splined to the same spline portion 5a of the transmission input shaft 5, in addition to the motor shaft 4.

The drive side sprocket 51 is provided on the transmission input shaft 5 and is a constituting part of a chain drive mechanism for driving the oil pump O/P. The drive side sprocket 51 is interposed between the transmission input shaft 5 and the end plate 45 and is rotatably supported on a stator shaft 54 fixed to the end plate 45 through a bush 55. In addition, the drive side sprocket 51 is splined to the transmission input shaft 5. The drive side sprocket is configured to transmit the rotating drive torque from the transmission input shaft 5 via an adaptor member 56 which is splined to the transmission input shaft 5 and is fitted by claw with respect to the drive side sprocket 51.

The resolver rotor 12 is disposed on the motor shaft 4 at a position adjacent to the drive side sprocket 51 and is one of the components of the resolver 11 known as of a variable reluctance (VR) type for detecting a rotational position of the motor rotor 92 of the motor/generator 9. The variable reluctance type resolver 11 is composed of the resolver rotor 12 and a resolver stator 13, as shown in FIGS. 2 and 3, and operable by using a principle in which the efficiency of a transformer of the resolver is changed due to variation in a gap provided in a magnetic path. The resolver rotor 12 is shaped such that the gap varies with respect a rotational angle periodically (FIG. 3 shows an example of a configuration of the resolver rotor in which angular outputs of three cycles per one revolution are output). The resolver stator 13 includes, as shown in FIG. 3, stator teeth provided by dividing the entire periphery of the resolver stator 13 equidistantly (for example, divided in twelve portions). A primary coil (exciting coil) 13a and a secondary coil 13b (detection coil) are wound on each of the stator teeth, as shown in FIG. 3.

The resolver retainer 14 is disposed concentrically with the rotational axis CL of the motor shaft 4 and is formed by a cylindrical member for fixedly supporting the resolver rotor 12 on the motor shaft 4. As shown in FIG. 2, the resolver retainer 14 includes a stopper 14c which has an inner contacting surface 14a for contacting on the shaft end portion 4a of the motor shaft 4 to thereby function as an axial positioning surface. Also, the resolver retainer 14 has an outer side end surface 14b formed opposite from the inner contacting surface 14a functioning as an axial position limiting surface of the drive side sprocket 51. The outer side end surface 14b is disposed opposite to the outer side end surface 56a of the adaptor member 56 of the drive side sprocket 51 configured in such a way that both outer side end surfaces 14b, 56a are positioned with an appropriate clearance. Thus, the outer end surface 14b of the stopper 14c is finished with a certain level of accuracy.

As shown in FIG. 3, a flat surface is formed on each of the motor shaft 4 and the resolver retainer 14, respectively, so as to form two opposing flat surfaces as the circumferential fitting surfaces. Thus, the motor shaft 4 and the resolver retainer 14 include a so-called width across flat fitting structure 16 (chamfered fitting structure) to restrict relative displacement in the circumferential direction. Further, the resolver retainer 14 is fixed with respect to the motor shaft 4 by way of press fitting as shown in FIG. 2. In addition, the resolver rotor 12 is formed with a protrusion 12a on the inner periphery surface as shown in FIG. 3 while the resolver retainer 14 is provided with a groove 14e so that the resolver rotor 12 is fixed circumferentially with respect to the resolver retainer 14 by engaging the protrusion 12a in the groove fitting.

The snap ring 18 is fitted in a ring-shaped or annular groove 4b provided in the motor shaft 4 and is configured to limit an axial position of a pair of bearings 15, 15 which rotatably support the motor shaft 4 with respect to the cylinder housing 81. As shown in FIG. 2, the resolver retainer 14 includes a stopper groove 14d which is provided in a side end portion of the resolver retainer 14 facing the bearings 15, 15 and which is configured to cover both a side surface and an outer circumferential surface of the snap ring 18.

The fixing ring 19 is fixed to the resolver retainer 14 through press-fitting or screw connection and is configured to limit an axial position of the resolver rotor 12.

An operation of the embodiment as mentioned above is described now. The "problem in a comparative example" is first addressed, and subsequently an operation of the driving force transmission device for a hybrid electric vehicle according to the first embodiment is described separately in terms of a "chain driving-operation of the oil pump O/P", an "axial position limiting operation of the sprocket by the resolver retainer", a "fixing operation of the resolver rotor", and a "retaining operation of the snap ring by the resolver retainer".

Problems of Comparative Example

Figure 4:
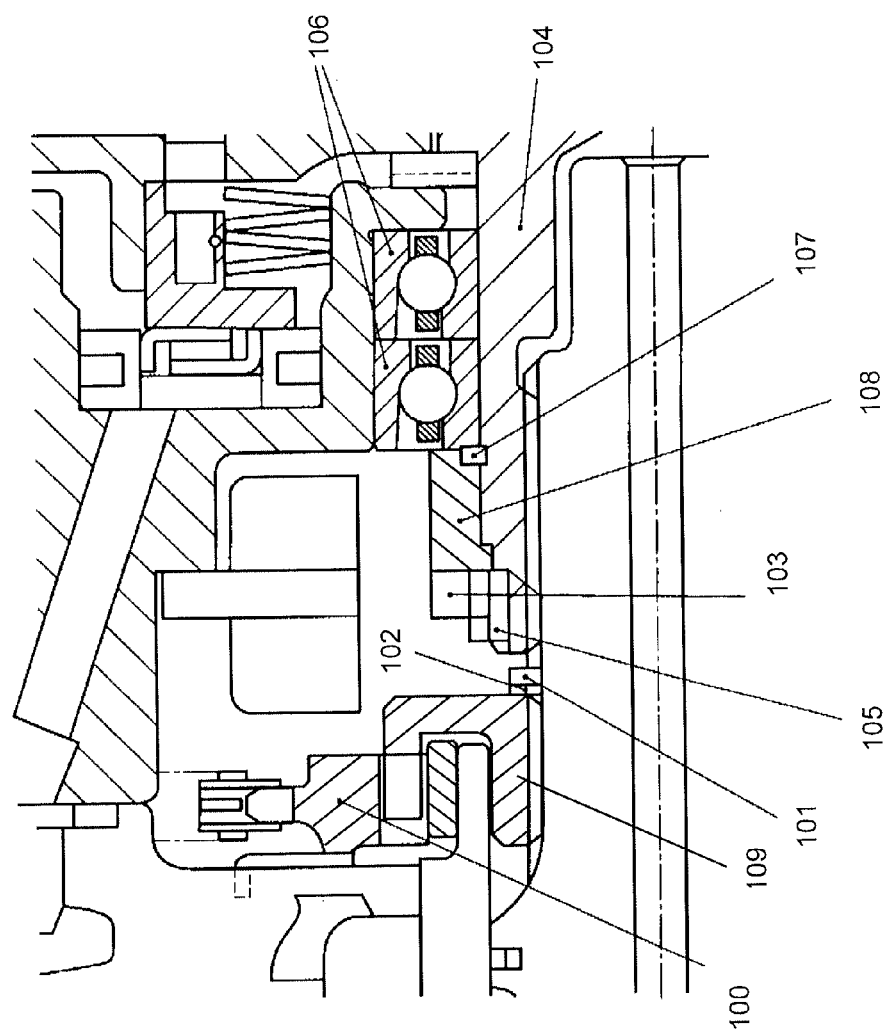
FIG. 4 is a sectional view showing a main part of a comparison example in which a resolver and a drive side sprocket of an oil pump are provided in a driving force transmission device for a hybrid electric vehicle.

A comparative example is assumed, in which, in an electrically driven vehicle with no torque converter installed, a connection portion between a motor clutch unit and a transmission unit is structured as shown in FIG. 4.

An oil pump sprocket 100 is provided. In the connection structure, a snap ring 101 and a shim 102 are provided for a positional restriction to secure an appropriate clearance.

On the other hand, a semi-circular shaped groove is provided in each of the motor shaft 104 and a resolver rotor 103 to limit a rotational phase of the resolver rotor 103 disposed close to the oil pump sprocket 100. When assembling, the semi-circular shaped grooves of the motor shaft 104 and the resolver rotor 103 are mutually adjusted in phase and fitted to each other to form a circular hole, in which a spring pin 105 is inserted to fix the resolver rotor 103.

In addition, a snap ring 107 is provided on a front side (right side in FIG. 4) of the resolver rotor 103 to limit an axial position of the bearings 106, 106. A snap ring retaining member 108 is press-fitted in the motor shaft 104 such that the snap ring 107 is prevented from being falling off from the by a centrifugal force. An adaptor 109 is provided to connect the oil pump sprocket 100 to the transmission input shaft. Consequently, there are the following problems in the connection structure between the motor & clutch unit and the transmission unit in the comparative example.

(a) It is required to provide parts such as the shim, the snap ring, etc. to limit the axial position of the oil pump sprocket. Therefore, the number of parts is increased, and hence the driving force transmission device is expensive.

(b) When assembling the snap ring and the like to limit the axial position of the oil pump sprocket, because of a narrow space for disposing the snap ring and the like, the assembly workability is poor and the assembling operation is difficult.

(c) Because of a required process for forming the semi-circular shaped groove in each of the motor shaft and the resolver rotor, the steps of processes is increased and workability of parts becomes poor.

(d) The snap ring-retaining member is provided as a separate part for preventing the snap ring from falling off due to a centrifugal force. Thus, the number of parts is increased.

Chain-Driving Operation of Oil Pump O/P

A chain-driving operation of the oil pump O/P is described. When a torque, due to the rotational driving of the engine Eng or the motor/generator 9 is transmitted to the transmission input shaft 5, the torque is transmitted to the pump shaft 57 of the oil pump O/P through the chain-driving mechanism. Simultaneously, the torque is transmitted to the components (for example, the V belt-type continuously variable mechanism 42, the mechanism 43 for changing forward and backward running of vehicle, and the dry-type, multi-plate clutch 7) mounted on the transmission input shaft 5, as well.

At this time, a radial load applied to the drive side sprocket 51 of the chain-driving mechanism by the chain 53 is supported by the stator shaft 54 fixed to the transmission housing 41. In other words, the radial load (tensile load) exerted on the drive side sprocket 51 by the chain 53 is supported by the transmission housing 41, which is a stationary member, through the stator shaft 54. On the other hand, the torque caused by the rotational driving of the transmission input shaft 5 is transmitted to the drive side sprocket 51 of the chain-driving mechanism through the adapter member 56.

That is to say, a load supporting function of the drive side sprocket 51 and a torque transmitting function to the drive side sprocket 51 are separated. The stator shaft 54 assumes the load supporting function and the adapter member 56 bears the torque-transmitting function. Therefore, an inclination of the rotational axis generating a variation in an alignment of the component mounted on the transmission input shaft 5 is prevented since the radial load due to the chain 53 would not act on the transmission input shaft 5. The V belt-type continuously variable mechanism 42 provided directly on the transmission input shaft 5, or the mechanism 43 for changing between a forward and backward running of vehicle, provided with a planet gear array, are included as the mounted components. In addition, the dry-type multi-plate clutch 7 arranged through the motor shaft 4 splined to the transmission input shaft 5, that is to say, the dry-type, multi-plate clutch 7 disposed indirectly on the transmission input shaft 5, is also included because an alignment of this clutch is subject to an influence by the inclination of the transmission input shaft 5.

In this way, in the first embodiment, when the drive side sprocket 51 is provided, such a structure is adapted in which the stator shaft 54 supporting the load and the adapter member 56 transmitting the rotational driving torque are separately provided. Consequently, this configuration makes it possible to prevent the inclination of the transmission input shaft 5, and the durability of the mounted components (for example, the V belt-type continuously variable mechanism 42, the mechanism 43 for changing between a forward and backward running of a vehicle, and the dry-type multi-plate clutch 7) on the transmission input shaft 5 will be improved.

Axial Position Limiting Operation of Sprocket by Resolver Retainer

As described above, when driving the oil pump O/P by the chain, it is necessary for an axial movement of the adapter member 56 axially movable due to spline fitting to be limited within a predetermined range of movement that ensures a high driving efficiency and stable chain driving. The operation of the resolver retainer that ensures this axial limiting operation is now described below.

An assembling method of the motor & clutch unit M/C and the transmission unit T/M is first described. On the motor & clutch unit M/C side, the resolver rotor 12 is previously assembled by positioning onto the motor shaft 4 through the resolver retainer 14. On the other hand, on the transmission unit T/M side, the drive side sprocket 51 is previously assembled only by splining the adapter member 56 to the transmission input shaft 5 to which the drive side sprocket 51 is attached, without limiting the axial position of the drive side sprocket 51. The connection of the motor & clutch unit M/C and the transmission unit T/M, each having been completed as a sub-assembly unit, is performed by splining the motor shaft 4 to the transmission input shaft 5 and subsequently fastening the clutch unit case 46 and the transmission housing 41 using, for example, a bolt (not shown).

When assembling the resolver rotor 12, the axial position of the resolver rotor 12 is positioned by contacting the inner contacting surface 14*a* of the stopper 14*c* of the resolver retainer 14 with the end portion 4*a* of the motor shaft 4. In a state where the motor & clutch unit M/C and the transmission unit T/M are connected, the axial position of the drive side sprocket 51 is limited within a predetermined range by a space provided between the outer limiting surface 14*b* of the stopper 14*c* and the outer end surface 56*a* of the adapter member 56.

That is to say, the axial position of the drive side sprocket 51 can be limited only by connecting the motor shaft 4 and the transmission input shaft 5 coaxially through the spline fitting. Consequently, it is not necessary to provide the parts such as the shim, the snap ring and so on, which are used to maintain an adequate clearance between the drive side sprocket and the motor shaft, as in the comparative example. In addition, the assembly work of the drive side sprocket in a narrow space using the shim, the snap ring and so on in the comparison example is not required.

In this way, in the first embodiment, the resolver retainer 14 functioning an axial positioning of the resolver rotor 12 also serves as a member that limits an axial position of the drive side sprocket. Consequently, when assembling the drive side sprocket 51 and the resolver rotor, which are disposed adjacent to each other, reduction in the number of parts as well as improvement in assembly workability can be accomplished.

Fixing Operation of Resolver Rotor

In the comparative example described above, because a method in which the resolver rotor is fixed to the motor shaft by the spring pin is adopted, a large number of steps are required. In this situation, there is a demand to achieve improved part workability when fixing the resolver rotor by a rotational phase positioning. A fixing operation of the resolver rotor to satisfy such a demand is described below.

In the first embodiment, the resolver rotor 12 is fixed to the motor shaft 4 through the resolver retainer 14 by the rotational phase positioning. The resolver retainer 14 is fixed to the motor shaft 4 by the width across flat fitting structure 16 which is provided on a circumferential assembling surface on both the motor shaft 4 and the resolver retainer 14. In this case, the resolver retainer 14 is press-fitted in the motor shaft 4 while the resolver rotor 12 is circumferentially fixed by fitting with respect to the resolver retainer 14.

Accordingly, in terms of machining process, only a chamfering process may be necessary to be applied onto two opposing surfaces of the motor shaft 4 and the resolver retainer 14 circumferentially facing to form the fitting structure including the first flat surface and the second surface. In the case of assembling for fixing the resolver rotor 12, the following processes are carried out. The resolver retainer 14 is first press-fitted on the motor shaft 4. The resolver rotor 12 is then attached to the resolver retainer 14 to be fixed circumferentially. Subsequently, the axial position of the resolver rotor 12 is fixed by the fixing ring 19.

As described above, in the first embodiment, the number of work processes can significantly be reduced and good workability of parts can be accomplished, compared with the comparative example in which it is necessary that the semi-circular-shaped grooves are processed in in each of the motor shaft 4 and the resolver rotor 12. Moreover, in the first embodiment, as a fixing member of the resolver rotor 12, the resolver retainer 14 is substituted for the spring pin in the comparative example to thereby acquire a simpler structure.

Retaining Operation of Snap Ring by Resolver Retainer

In the comparative example, because the snap ring-retaining member 108 is provided independently or separately, the number of parts is increased. In this connection, there is a demand to reduce the number of parts in a mounting structure of the resolver rotor 12. A retaining operation of the snap ring by the resolver retainer 14 to satisfy such a demand is described below.

In the first embodiment, the stopper groove 14*d* is provided on the end portion of the resolver retainer facing the bearing to cover the side surface and the outer circumferential surface of the snap ring 18 so as to limit the axial position of the bearings 15, 15.

Accordingly, when the motor shaft is rotated, the stopper groove 14*d* provided in the resolver retainer 14 acts as a stopper when the snap ring 18 is expanded in an outer circumferential direction due to a centrifugal force.

In this way, in the embodiment, the provision of the stopper groove 14*d* retaining the snap ring removes the need for a specific part to retain the snap ring 18 (a part preventing the snap ring from being removed). Thus, the number of parts is reduced.

That is to say, the resolver retainer 14 in the first embodiment commonly functions for an axial positioning of the resolver rotor 12, an axial position limiting of the drive side sprocket 51, a rotational phase fixing of the resolver rotor 12, and a retaining of the snap ring 18*a*.

Now, technical effects of the drive force transmission device for a hybrid vehicle in the first embodiment are described as follows.

(1) A driving force transmission device includes a motor shaft 4 connected to a motor rotor 92 of a motor (motor/generator 9), a driving force transmission shaft (transmission input shaft 5) connected concentrically to the motor shaft 4, an oil pump sprocket (drive side sprocket 51) provided on the driving force transmission shaft 5 operative to rotatably drive the oil pump O/P, a resolver rotor 12 disposed on the motor shaft 4 at the position adjacent to the oil pump sprocket (drive side sprocket 51) and operative to detect a rotational position of the motor (motor/generator 9), and a cylindrical resolver retainer 14 disposed concentrically on the motor shaft 4 and configured to support fixedly the resolver rotor 12 on the motor shaft 4. The resolver retainer 14 includes a stopper 14*c* having an inner contacting surface 14*a* forming an axial positioning surface of the resolver rotor 12 by contacting with the end portion 4*a* of the motor shaft 4 and an outer side end surface 14*b* opposite to the inner contacting surface 14*a* forming an axial position limiting surface of the oil pump sprocket (drive side sprocket 51). Consequently, it is possible to accomplish a reduction of the number of parts and improvement in the assembly workability when assembling the oil pump sprocket (drive side sprocket 51) and the resolver rotor 12, which are disposed adjacent to each other in the drive system.

(2) A chamfered fitting structure (width across flat fitting structure 16) is provided on the circumferential fitting surfaces on the motor shaft 4 and the resolver retainer 14 so as to restrict relative positional relation in the circumferential direction. The resolver retainer 14 is press-fitted in the motor shaft 4, and the resolver rotor 12 is circumferentially fixedly fitted to the resolver retainer 14. Consequently, it is possible to simplify the fixing structure of the resolver rotor 12, reduce the number of work processes significantly, and secure a good workability of parts in addition to the effects described in (1).

(3) A ring shaped groove 4*b* is formed in the motor shaft 4, and a snap ring 18 is fitted in the ring-shaped groove 4*b* so as to limit an axial position of the bearing 15 rotatably supporting the motor shaft 4 on the case member (cylinder housing 81). A stopper groove 14*d* is further provided in the side end portion of the resolver retainer 14 facing the bearing 15 and is configured to cover the side surface and the outer circumferential surface of the snap ring 18. Consequently, it is not necessary to provide a separate component in order to retain the snap ring 18, and thus a reduction in the number of parts is achieved, in addition to the effects described in (1) and (2).

Although the driving force transmission device according to the present invention has been described above based on the first embodiment, it should be understood that the specific structure or configuration is not limited to the first embodiment. Rather, various modifications and changes can be made to the embodiment by those skilled in the art as long as such modifications and the changes are within the scope of the present invention as defined by the claims.

The first embodiment illustrates an example in which a transmission input shaft 5 is used as the driving force transmission shaft connected coaxially to the motor shaft 4. However, because the present invention may also be applicable to a drive system for an electrically driven vehicle without a transmission, as long as the shaft is disposed coaxially with the motor shaft, other example using a shaft other than the transmission input shaft may be used.

The first embodiment illustrates an example in which the resolver retainer 14 incorporates all the functions of the axial positioning of the resolver rotor 12, the axial position limiting of the drive side sprocket 51, the rotational positioning fixing of the resolver rotor 12, and the retaining of the snap ring 18. However, as long as the resolver retainer 14 may have at least both the axial positioning function of the resolver rotor 12 and the axial position limiting function of the oil pump sprocket, other example of configuration may be employed.

The first embodiment illustrates an example in which the driving force transmission device is applied to a hybrid vehicle on which the engine and the motor/generator are installed as a drive source. However, the present invention may be applied to an electric vehicle on which only the motor/generator as a drive source is installed. In sum, the present invention is applicable to an electrically driven vehicle in which a resolver rotor and an oil pump sprocket are disposed adjacent to each other in a drive system.

The invention claimed is:

1. A drive force transmission device comprising:
   a motor shaft configured to be connected to a motor rotor of a motor;
   a driving force transmission shaft coaxially connected to the motor shaft;
   an oil pump sprocket provided on the driving force transmission shaft for rotating an oil pump;
   a resolver rotor disposed on the motor shaft at a position adjacent to the oil pump sprocket for detecting a rotational position of the motor; and
   a cylindrical resolver retainer coaxially disposed on the motor shaft and fixedly supporting the resolver rotor on the motor shaft,
   the resolver retainer including a stopper having an inner contacting surface that forms an axial positioning surface for the resolver rotor by contacting an end portion of the motor shaft, and an outer side end surface opposite to the inner contacting surface that forms an axial position limiting surface of the oil pump sprocket.

2. The drive force transmission device as claimed in claim 1, wherein
   the motor shaft has a circumferential fitting surface and the resolver retainer has a circumferential fitting surface that mates with the circumferential fitting surface of the motor shaft to form a chamfered fitting structure that restricts relative rotational movement therebetween, the resolver retainer is press-fitted to the motor shaft, and the resolver rotor is circumferentially fixedly fitted to the resolver retainer.

3. The drive force transmission device as claimed in claim 1, wherein
the motor shaft has a ring shaped groove with a snap ring fitted in the ring-shaped groove so as to limit an axial position of a bearing rotatably supporting the motor shaft on a case member, and
the resolver retainer has a side end portion that faces the bearing, the side end portion defines a stopper groove that covers an axially facing side surface of the snap ring and an outer circumferential surface of the snap ring.

4. The drive force transmission device as claimed in claim 2, wherein
the motor shaft has a ring shaped groove with a snap ring fitted in the ring-shaped groove so as to limit an axial position of a bearing rotatably supporting the motor shaft on a case member, and
the resolver retainer has a side end portion that faces the bearing, the side end portion defines a stopper groove that covers an axially facing side surface of the snap ring and an outer circumferential surface of the snap ring.

* * * * *